3,446,706
PROCESS OF PRODUCING PLANT PROTEASES
Jack F. Beuk, 6 S. Madison St.,
Hinsdale, Ill. 60521
No Drawing. Filed Jan. 27, 1966, Ser. No. 523,265
Int. Cl. C12b *1/00;* C12d *13/10*
U.S. Cl. 195—66                                                    8 Claims

ABSTRACT OF THE DISCLOSURE

An improved enzyme material for ante-mortem injection into animals is prepared by reversibly inactivating the enzyme in a solution and then holding the solution for an extended period of two hours or greater at a pH adjusted to at least about 7.5 or higher.

---

The present invention relates to a method for preparing plant-derived proteolytic enzyme solutions of particular value in ante-mortem injection of animals to obtain uniform tenderization of meat derived from such animals.

The technique of ante-mortem enzyme injection as a means of meat tenderization is disclosed and claimed in U.S. Patent No. 2,903,362, issued Sept. 8, 1958. Briefly, this technique involves the introduction preferably by injection of a solution of a plant-derived proteolytic enzyme, such as papain, bromelin or ficin, into the vascular system of a living animal, holding the animal for a time sufficient to obtain uniform distribution of the enzyme throughout the animal's system, and subsequently slaughtering the animal. While the above technique is of substantial value in obtaining meat which when cooked is uniformly tender, there are some undesirable animal side reactions, such as internal hemorrhaging and edema of the organs, which occur if commercially prepared enzyme solutions which contain certain undesirable components are employed. These components which cause the undesirable side reactions are of unknown composition at the present time, and are recognizable only by the effect upon injected animals.

Various attempts have been made to eliminate these undesirable components from solutions of commercial enzymes, that is solutions prepared from enzymes which have undergone a limited form of purification in order to meet Food and Drug Administration standards and which are sold as food grade enzymes. As an example of techniques presently employed in purifying such solutions, U.S. Patent No. 3,052,551, issued Sept. 4, 1962, describes methods for the purification and stabilization of enzyme solutions which comprise (1) reversibly inactivating the enzyme by treatment with hydrogen peroxide and catalase, (2) aeration to reversibly inactivate the enzyme, (3) purifying the enzyme by fractionation with a salt, (4) fractionation of the enzyme with ethanol, (5) fractionation of the enzyme with acetone, (6) ethanol fractionation combined with hydrogen peroxide inactivation.

While the above methods of purification and stabilization are of significant value in eliminating the undesirable physiological reactions in the animals which result from the use of commercially prepared enzyme solutions, they possess several inherent disadvantages. Decreased yields of active enzyme is a characteristic of solvent and salt fractionation methods. Low yields are particularly noticeable when salt fractionation is employed. Excessive foaming of the solution results from the use of a large amount of catalase in neutralizing the hydrogen peroxide in solution, since the amount of hydrogen peroxide, of necessity, has been great in this process. Such excessive foaming presents troublesome interference with solution handling in subsequent manipulations.

Thus, it would be desirable to have a method for preparing an enzyme solution which would be free of the conponents that cause undesirable side effects in injected animals, while yielding a high percentage of active enzyme which method is free of excessive foaming.

Therefore, it is an object of the present invention to provide a method for preparing an enzyme solution having low foaming tendencies and yielding a high amount of active enzyme, while being free from the undesirable components which cause detrimental side reactions in animals injected with said solution.

It is a further object of the present invention to provide a low foaming enzyme solution which contains a high percentage of active enzyme, but which will not cause detrimental side reactions in an animal injected with said solution.

It is a further object of the present invention to provide a method for eliminating the undesirable components from commercial enzyme solutions without the necessity of employing a fractionation step.

It is a further object of the present invention to provide a method for eliminating undesirable components from commercial enzyme solutions which will permit the use of smaller amounts of hydrogen peroxide and catalase than heretofore possible.

Additional objects of the present invention, if not specifically set forth herein, will be readily apparent to those skilled in the art from a reading of the following detailed description of the invention.

Generally, the invention includes certain modifications of known methods, these modifications involving certain critical adjustments of the pH during the various stages of the above-described enzyme stabilization method, as well as certain limitations on the holding times at various stages of the process.

More specifically, it has been found that the improvements of the present invention may be obtained by adjusting the pH of the enzyme solution to at least about 7.5 prior to inactivation of the available enzyme fraction by a method such as the previously mentioned hydrogen peroxide-catalase treatment. Additionally, the present method requires readjustment of the pH subsequent to addition of the catalase in order to maintain the required pH. In order to render the enzyme usable for the purposes of the present invention, the finally adjusted solution is held at the required pH for at least 2 hours prior to use.

Thus, the present method comprises the initial formation of an enzyme solution, the pH of which is adjusted preferably to at least about 7.5, held for a period of time, and inactivation of the available enzyme fraction by a process such as hydrogen peroxide-catalase treatment. After the hydrogen peroxide-catalase treatment, the pH of the solution is preferably readjusted to at least 7.5, if necessary, and held for a period of time, desirably at a temperature below room temperature in order to prevent bacterial growth, in order to destroy the undesirable components present. After holding, the enzyme solution may then be sterilized and refrigerated until used.

As mentioned above, the pH of the solution in the present method should be at least 7.5. However, it has been found that the higher the pH, the better the result ordinarily obtained. However, certain practical restrictions render it difficult to employ a pH of much above about 10–10.5. These restrictions are primarily due to the fact that enzymes become unstable at these higher pH's, and thus render such pH's impractical in commercial usage. Thus, from a commercial standpoint it has been found that pH's within the range of 7.8 to about 10.5, with a preferred pH of about 8.0 to about 9.5 are best for obtaining the optimum results of the present invention.

In some instances, it has been found that the maximum stability and activity of the enzyme may be obtained by adjustment of the pH to from about 5 to about 8, preferably 7 to 8, prior to injection of the enzyme into the animal. However, this desirable activity and stability may be offset in some instances by employment of large volumes of solution at this lower pH which is more acid than the normal pH of the animal's blood, and thus may cause detrimental reactions by injection of the different pH solution.

Ordinarily, the starting enzyme solutions used in the present invention are prepared by first forming a paste of the commercial plant-derived proteolytic enzyme and an organic water-soluble liquid, such as glycerine, glycols, or other water soluble or water dispersible wetting agents. The paste thus formed is then dissolved in water having a temperature of about 10–15° C. in order to prepare the working solution. It will be understood, however, that this method is not critical to the operability of the present invention, and alternative methods for forming enzyme solutions may be employed.

As previously mentioned, it has been found that the holding of the enzyme solution at the higher pH of at least about 7.5 and preferably above 7.8 for a period of time after the catalase treatment has been found to be highly desirable in obtaining effective destruction of the factors which cause detrimental reactions in injected animals. The length of holding time required will necessarily vary dependent upon the source and purity of the initial enzyme powder being processed by the present method. In occasional instances, it has been found that holding for as little as 2 hours is effective in inactivating or removing those substances causing reactions of subsequently injected animals. However, for most enzyme solutions a holding period of from about 10 hours to about 24 hours is normally employed. In some instances, a holding period of up to about 48 hours may also be employed. Additionally, it has been found that the length of the holding period required is dependent to a large extent upon the enzyme source.

As a test for determining the effectiveness of a process for destroying the undesirable components in an enzyme solution, it has been found that the available milk clotting activity of the resultant enzyme solution is directly proportional to the amount of destruction of the undesirable factors. In this regard, the following tables will show that the reduction of available milk clotting units per milliliter, and thus the reduction in animal reactivity, is directly proportional to the holding time and pH employed. Although one would obtain the impression from reading the following tables that the optimum results would be obtained with the longest holding period, it should be noted that the decrease in the undesirable factors causing animal reactivity is somewhat offset at the longer holding periods, that is holding periods of somewhat above 48 hours, in that the bacterial count of the enzyme solutions begins to increase sharply after this period, thus rendering the enzyme solutions less desirable for this reason. As mentioned initially, the holding period is preferably carried out at temperatures somewhat below room temperature, the reason being that the increase in bacterial count is lessened at the lower temperatures. Similarly as the holding period is lengthened to about 48 hours there is a likelihood that activity of the solution will decrease. In this regard, temperatures of from about 10° C. to about 15° C. are commonly employed. Anti-bactericidal agents may also be employed in some instances to reduce bacterial contamination.

It will become evident to one skilled in the art upon a reading of this specification that various additional steps may be added to the method of the present invention without adversely affecting the desired results obtained. These additional steps, such as filtration, dilution, etc., have been disclosed in the prior art and, as such, will be readily apparent to one skilled in the art to which the present invention pertains.

As has been noted above, the present process differs from certain of the previous processes in that no fractionation step is required. Conversely, prior methods have involved a required fractionation with sodium chloride, or other salt, or solvent fractionation has been employed in some instances. Obviously, elimination of solvent or salt fractionation results in increased economy as well as a shorter processing time. More importantly, experiments have shown that fractionation inevitably results in a substantial decrease in enzyme yield. To illustrate, comparison of the present process with prior processes involving fractionation shows yields of from 6 to 8 times as great with the present process. Specifically, 105 pounds of crude papain powder processed by prior methods yielded from 300–400 liters of purified papain solution, whereas 2,400 liters of solution of equivalent concentration were obtained using the present process.

As heretofore stated, several methods of reversible enzyme inactivation may be employed, for example, aeration or treatment with various oxidizing agents. However, the hydrogen peroxide-catalase treatment has been found to be most desirable in that the peroxide treating agent leaves no residue in the solution after inactivation and no expensive equpiment is required. The high foaming properties resulting from the large amount of catalase required in the prior art operations, however, renders the hydrogen peroxide-catalase treatment undesirable in many instances in that high foaming of the enzyme solution interferes with subsequent manipulations, such as injection into the animal, measuring of the solution, filtration, dilution, etc. With the present process, it has been found that a substantial reduction in the amount of hydrogen peroxide required, and thus in the amount of catalase required in the neutralization step, is possible. For example, prior processes have required a minimum of about 1.0 milliliter of hydrogen peroxide (30%) per liter of enzyme solution to as much as 30 milliliters. However, with the present process it is possible to use as little as .01 milliliter of 30% hydrogen peroxide per liter of enzyme solution to assist in obtaining effective inactivation of the available milk clotting fraction. Ordinarily, 0.2 milliliter to about .06 milliliter of $H_2O_2$ are employed.

The following examples are given as illustrative of the present process and the results derived therefrom. The examples should be considered as illustrative only and not in any way limiting the scope of the present invention.

EXAMPLE I

Twenty-five grams of commercially available papain powder was wetted with an equal weight of C.P. glycerine and mixed to a consistency of paste. The paste was then added to cold distilled water (10–15° C.) and made to 1,000 milliliters with additional cold distilled water. The enzyme solution thus formed was then agitated slowly for 20 to 30 minutes in a cold room, the pH adjusted to 8.0 with 5 N NaOH and the stirring continued for an additional 20 to 30 minutes. Five grams of Hyflo-Super-Cell, a diatomaceous earth, was added and the enzyme solution filtered through a Buchner funnel. The solution was then treated with 0.02 milliliters of 30% hydrogen peroxide per liter of solution, followed in 10 minutes by 0.04 milliliter of liver catalase (100 Keil units/milliliters) per liter of enzyme solution. The clarified peroxide-catalase enzyme solution was then readjusted to a pH of 8 and held in a cooler (10–15° C.) for 24 hours. A preliminary dilution of the enzyme solution based upon the biuret protein analysis was then made and the enzyme solution was sterilized by passing through a Seitz press using a bacterial retentive asbestos pad. A final dilution was then made based upon the biuret protein analysis of the Seitz enzyme solution so that biuret protein is about 0.88 to about 1.1. The solution after the salt content was adjusted to 1% was again passed through a sterile press, bottled and frozen until used.

In addition to the foregoing steps, intermediate adjustments of pH to maintain pH 8 may be made, if necessary. For example, an adjustment to pH 8 should be made prior to filtration of the enzyme solution.

EXAMPLE II

Twenty-five grams of a commercially available papain powder (A) was wetted with an equal weight of C.P. glycerine and stirred to a consistency of paste. The paste was then suspended in 1,000 milliliters of cold distilled water, and agitated slowly for 20 to 30 minutes, after which the pH was adjusted to 8.0 with 5 N NaOH and the stirring continued for an additional 20 to 30 minutes. The resultant solution was then clarified by filtration. Hydrogen peroxide in the amount of 0.02 milliliter of 30% solution was added, followed 10 minutes later with the addition of 0.04 milliliter of catalase to inactivate the residual peroxide. The solution was then readjusted to pH 8.0 with sodium hydroxide and placed in a cooler for 24 hours. The pH was then lowered to 5.0 with 6 N HCl, sterilized, and frozen until analyzed.

EXAMPLE III

A process similar to that of Example II was conducted with the exception that the pH was adjusted to 8.5 as opposed to 8.0 in the steps of the above example.

EXAMPLE IV

A process similar to that described in Example II was conducted with the exception that in those cases where pH was adjusted during processing the pH was adjusted to 9.0 rather than pH 8.0.

The following table is presented to show the effectiveness of the varying degree of pH in the above examples upon the available milk clotting units present in a sample, and thus upon the effectiveness of the destruction of those factors which cause animal reaction:

| Examples | Milk clotting total | Units/ml. available | Biuret protein, percent |
| --- | --- | --- | --- |
| II | 22.65 | 3.38 | 1.26 |
| III | 22.90 | 2.89 | 1.25 |
| IV | 22.10 | 2.36 | 1.27 |
| Untreated | 25.7 | 12.00 | 1.27 |

EXAMPLE V

A process similar to that of Example II was conducted utilizing a different commercially available enzyme (B).

EXAMPLE VI

A process similar to that in Example V was conducted with the exception that the enzyme solution was held for 48 hours as opposed to 24 hours as described in Example II.

EXAMPLE VII

A process similar to that described under Example V was conducted with the exception that the enzyme solution was held at cooler temperatures for 72 hours.

The following table illustrates the effectiveness of the increased holding time upon the available milk clotting units present in the final enzyme solution:

| Examples | Milk clotting Total | Units/ml. available | Biuret protein, percent |
| --- | --- | --- | --- |
| V | 19.9 | 8.0 | 1.15 |
| VI | 19.7 | 3.9 | 1.16 |
| VII | 18.4 | 1.3 | 1.20 |
| Untreated | 21.2 | 12.4 | 1.20 |

As has been noted previously, the method of this invention provides a great advantage over fractionation procedures, particularly insofar as insuring high enzyme yields is concerned. The method can also be combined with fractionation methods such as acetone precipitation to allow for the production of greater volumes of solution at lower cost and in less time utilizing the same equipment. It is also possible using such a combined procedure to treat commercial enzyme preparations which are very high in available milk clotting fractions by holding the enzymes for an additional 24 hours without fear of bacterial contamination. Example VIII which follows illustrates this modification of the invention disclosed and claimed herein:

EXAMPLE VIII

The crude enzyme is wetted with an equal weight of glycerine and suspended in water and the solution is agitated to dissolve the enzyme. Insoluble materials such as twigs, leaves, dust, etc., are removed by filtration and the clarified solution is then treated with sufficient 5 N NaOH to adjust the pH to 8.0. The resultant solution is clarified by filtration and hydrogen peroxide in the amount of 0.02 milliliter of 30% hydrogen peroxide solution for each liter of solution is added followed 10 minutes later with the addition of 0.05 milliliter of catalase to inactivate the residual peroxide. The pH is then readjusted to 8.0 with sodium hydroxide and the mixture is held in the cooler for 24 hours. The cooled solution is then mixed wtih acetone using 3 volumes of acetone to each volume of enzyme so as to assure maximum precipitation of the enzyme. Although the enzyme may be precipitated at pH 5.0, it has been found that precipitation at pH 8.0 results in the production of an enzyme which has a lower available milk clotting value and in turn less tendency to exhibit adverse physiological reactions in the animals treated with the enzyme. The precipitated enzyme is separated from the acetone-water solution by filtration and the enzyme is dried, packaged and stored for use. This combined process shortens considerably the time required for manufacture and accordingly represents a significant commercial advantage in enzyme production.

Obviously many modifications and variations of the invention as hereinbefore set forth may be made without departing from the spirit and scope thereof, and therefore only such limitations should be imposed as are indicated in the appended claims.

I claim:

1. A method for preparing a plant-derived proteolytic enzyme solution suitable for ante-mortem injection comprising: adjusting the pH of a plant-derived proteolytic enzyme solution to at least about 7.5, reversibly inactivating the enzyme present in the solution, readjusting the pH to at least about 7.5 and holding the solution for at least 2 hours at the stated pH until said solution causes no adverse physiological reactions when injected into meat bearing animals.

2. The method of claim 1, wherein the proteolytic enzyme is held for from about 10 to about 48 hours.

3. The method of claim 1 wherein the solution is held at a temperature of below about 15° C.

4. The method of claim 2, wherein the proteolytic enzyme solution is a solution of an enzyme selected from the group consisting of papain, bromelin and ficin and mixtures thereof.

5. The method of claim 1 wherein the reversible inactivation of the enzyme is achieved by hydrogen peroxide-catalase treatment.

6. The method of claim 1, wherein the initial pH and readjusted pH are within the range of about 7.8 to about 11.

7. The method of claim 1 wherein the enzyme is precipitated from solution with acetone and dried.

8. The method of claim 1 wherein the initial pH and readjusted pH are within the range of about 7.8 to about 11 and the reversible inactivation of the enzyme is achieved by hydrogen peroxide-catalase treatment.

References Cited

UNITED STATES PATENTS

| 3,052,551 | 9/1962 | Hogan | 99—107 |
| 3,235,468 | 2/1966 | Hogan | 99—62 |

LIONEL M. SHAPIRO, *Primary Examiner.*

U.S. Cl. X.R.

99—107